July 24, 1928.                                                1,678,157
I. W. MUNDEN
WHEEL ALIGNING GAUGE
Filed June 15, 1927
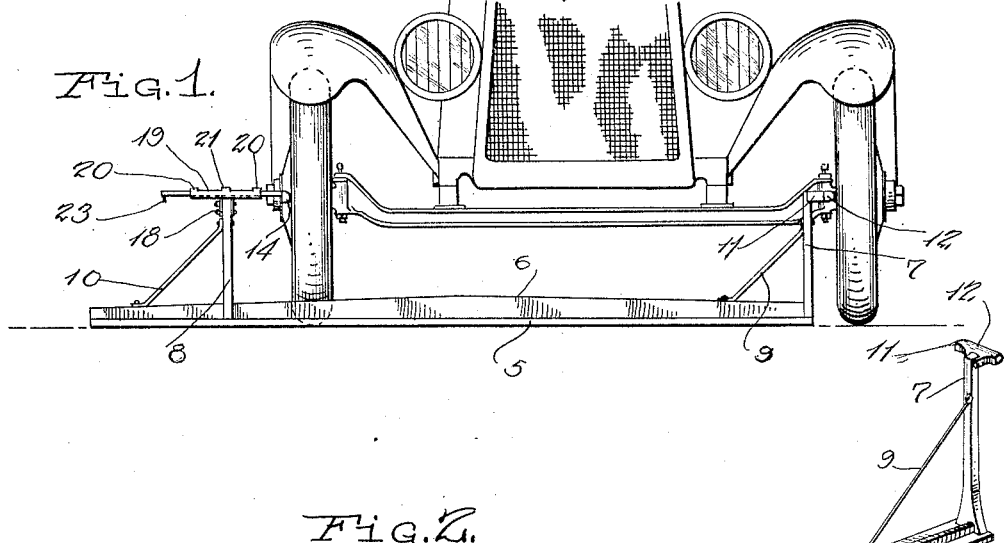
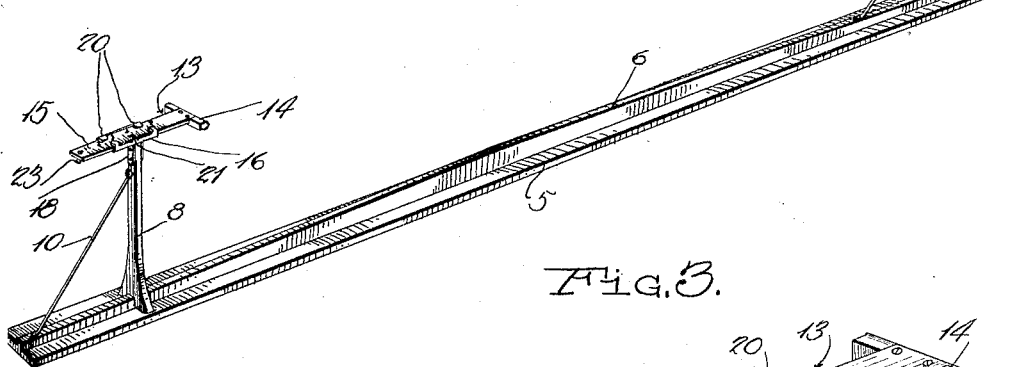
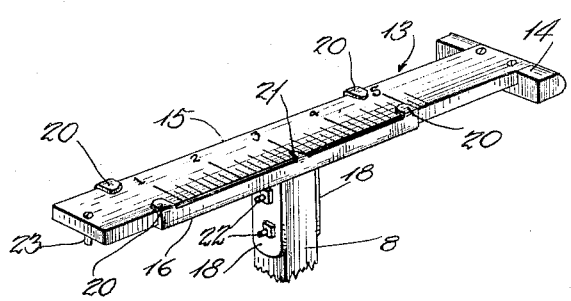
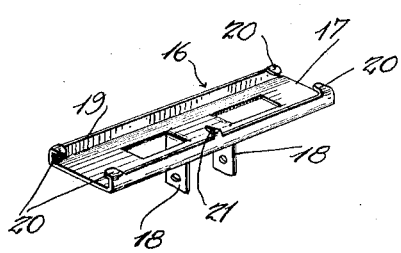
INVENTOR,
I. W. Munden.
BY Sterling P. Buck,
ATTORNEY.

Patented July 24, 1928.

1,678,157

UNITED STATES PATENT OFFICE.

ISAAC W. MUNDEN, OF TAMPA, FLORIDA.

WHEEL-ALIGNING GAUGE.

Application filed June 15, 1927. Serial No. 199,096.

This invention relates to gauges, and especially to an improved and simplified type of wheel-aligning gauge.

One object of this invention is to provide a gauging device of this character which is exceedingly simple of construction and capable of being manufactured at a relatively low cost, and at the same time exceedingly convenient and effective as a means for determining the forward convergence or divergence of the wheels of an automobile or the like, so as to enable the owner or repairer of the machine to adjust such wheels correctly with respect to one another. In this connection, it should be understood that if the automobile's front wheels, for instance, converge or diverge to any considerable extent, this causes an excessive wearing away of the tire treads, at the same time resulting in a waste of power. Another object is to provide a device of this character which will automatically determine the alignment of the wheels whether they are true, or to whatever extent they may be warped or untrue.

Another object of this invention is to provide a device of this kind which can quickly and easily be applied in gauging relation to the front and rear parts of the wheels, being insertable through the space under the chassis of the automobile without interference with low or under-slung parts of the automobile.

A further object is to provide a device of this character in which the gauging scale is automatically adjusted by the act of applying the device against the sides of the wheels, that is, against the inner side of one tire and the outer side of the other tire.

Another object is to provide a device of this character which is relatively small, light and compact, so it can be suspended from a hook or nail in a wall of a shop or garage, so it will not interfere with the workman or workmen, at the same time being out of danger of getting bent or broken by the working operations in the shop or garage.

Another object is to provide a simple, effective and comparatively inexpensive integrally formed member which constitutes a guiding support for the gauging scale, and an index to cooperate with the gauging scale.

Other objects and important features are pointed out or implied in the following details of description, in connection with the accompanying drawings in which:

Figure 1 is an elevation of the device applied to the front parts of the front wheels of an automobile, in the gauging position.

Figure 2 is a perspective view of my improved wheel-aligning gauge.

Figure 3 is an enlarged detail perspective view of the slidable gauging abutment and its supporting and guiding means.

Figure 4 is an enlarged perspective view of the sheet metal member which is formed integrally of a single blank, and constitutes the guiding support and index.

Referring to these drawings in detail, in which similar reference characters correspond to similar parts throughout the several views, and in which the front part of an automobile is shown to illustrate the application of the wheel-gauging device, the invention being shown in its entirety in Figure 2; the said invention consists of rigid and relatively movable parts which will now be described as follows:

A base or beam 5 is preferably composed of two firmly united wooden strips disposed at right angles to one another in such relation that they combine to form a T-beam, and the middle rib or upstanding flange 6 thereof is preferably relatively high at its middle and tapers towards both ends, so this base-beam is relatively stiff and light. Two uprights 7 and 8 are preferably notched at their lower ends to receive and embrace the rib 6 while their extreme lower ends rest on or extend through the horizontally disposed base flanges of said T-beams and are secured thereto by an appropriate and proper means. Inclined braces or rods 9 and 10 are secured to the respective uprights 7 and 8 so as to secure the uprights in substantially vertical position. The height of each upright is substantially one-half the height of an automobile wheel of standard diameter, so the upper ends of these uprights are substantially level with the hub-centers of the wheels. The upright 7 is located substantially at one end of the T-beam or base-beam, and for convenience in describing the device we may consider this as the right-hand end, the other as the left-hand end. The upright 8 is spaced a considerable distance from the left-hand end, thus providing an anchorage at such left-hand end for the brace 10 while reserving a clear space at the right-hand side of the upright 8, as well as of the upright 7, to receive the wheels to be gauged as will presently be explained.

A gauging abutment 11 includes a horizontally extending straight edge 12 and extends rightward from its anchorage on top of the upright 7. A gauging abutment 13 includes a straight edge 14 and a scale-beam 15 which may be calibrated in any suitable form to provide a linear measuring means. The straight edges 12 and 14 are parallel with one another and at right angles to a plane through the centers of the beam 5 and uprights 7 and 8. Both straight edges face rightward or in the same direction, and therefore both of them can be moved into contact with the sides of the tires by a single motion of the device in a rightward direction, as clearly obvious by an observation of the device as applied in Figure 1 of the drawings, assuming the member 13 to have been at its rightmost position when the device was placed in front of the left-front wheel and moved rightward. In such case, the part 13 is slid through its guiding support until the straight edge 12 abuts against the right-hand tire, whereupon the gauging member 13 comes to rest, and the measurement can be read on the scale by aid of an index which will presently be described. Preparatory to taking the measurement at the rear of the front wheels, the gauge-contact-points are first marked with chalk or other means on the wheels, then the wheels are turned through an angle of about one-hundred and eighty degrees, preferably by running the automobile forward or rearward, and the device is turned with the uprights extending substantially horizontally, whereupon it is slid longitudinally under the automobile, then turned to its upright position, and then slid into its gauging position with respect to the wheels, the edges 12 and 14 touching the marked gauge-contact-points, thereby effecting the gauging with utmost accuracy.

The guiding support 16, shown separately in Figure 4, is formed of a single blank of sheet metal, and consists of a horizontal plate 17, securing ears 18, vertical flanges or walls 19, inwardly extending lugs or ears 20, and a pointer or index 21. The ears 18 are apertured to receive bolts 22 or other appropriate means for securing them to opposite sides of the upright 8 which is embraced between these ears and combined therewith to support the plate 17 and its adjuncts in position for holding the member 13 in a substantially horizontal position and in parallel relation with the base-beam 5. The member 13 is slidable on the plate 17, its sliding movement being limited by the member 14 and by a screw or stud 23 which also prevents accidental displacement of the member 13 from the member 16. The ears 20 extend over the member 13 and prevent it from being moved upward with respect to the member 16. The ears 18 are preferably struck out from the metal between the ends and middle portion of the plate 17, so that all parts of the member 16 are formed integrally, so this device is not only comparatively cheap as to the cost of manufacturing, but also very effective for the purposes described.

I do not wish to limit my patent protection to the exact construction and arrangement shown and specified, but changes may be made within the scope of the inventive ideas as implied and claimed.

What I claim as my invention is:

1. A wheel-aligning gauge including a base-beam, uprights on opposite end portions of the base-beam, gauging abutments supported by the said uprights and including straight tire contacting surfaces facing in the same general direction, one of said gauging abutments being adjustable towards and from the other, and an index combining with the adjustable gauging abutment for indicating its position with respect to the other gauging element.

2. A wheel-aligning gauge including a base-beam, supporting uprights on opposite end portions of the base-beam, gauging abutments supported by the said supporting uprights and including straight tire-contacting surfaces facing in the same general direction, a guiding support including a horizontal plate formed with downwardly extending ears and upwardly extending walls, and an index, said downwardly extending ears embracing and secured to the subjacent part of one of said supporting uprights, said upwardly extending walls having inwardly extending parts spaced above the body of the plate to form a guiding and retaining means for the contiguous gauging abutment, said contiguous gauging abutment being provided with calibrations with which said index is in position to register, said contiguous gauging abutment being slidable on said plate towards and from the other one of such gauging abutments.

3. A wheel-aligning gauge including a base-beam which is substantially inverted T-shaped in cross section, a pair of uprights, at least one of such uprights being notched at its lower end and embracing the upwardly extending portion of the inverted T-shaped base-beam, this upright being at a distance from one end of the base-beam and at a greater distance from the other end of the base-beam, a bracing element extending from said notched upright towards the near end of the base-beam and secured thereto for holding this upright fixed in a substantially vertical position, a gauging abutment including a straight edge and a calibrated bar extending substantially at right angles to said straight edge, a substantially horizontal plate secured on said notched upright and provided with means to hold said calibrated bar in substantially parallel relation with said base-beam and to permit longitudinal adjustment of the calibrated bar and straight edge, an index supported by this notched upright in position to register with the calibrations of said bar, and a gauging abutment on the other one of said uprights, both of said gauging abutments facing in the same direction, for the purposes shown and specified.

4. In a device of the character described, a sheet metal member formed of a single blank and including a main body portion provided with opposite and parallel upright walls, said inwardly turned portions on said walls and spaced from the said main body portion, one of these inwardly turned portions constituting an index, said main body portion having struck out therefrom two downwardly extending spaced and substantially parallel ears provided with apertures, substantially as shown, for the purpose specified.

In testimony whereof I affix my signature.

ISAAC W. MUNDEN.